No. 895,669. PATENTED AUG. 11, 1908.
W. B. OGDEN.
EVAPORATING PAN.
APPLICATION FILED APR. 17, 1907.
2 SHEETS—SHEET 1.
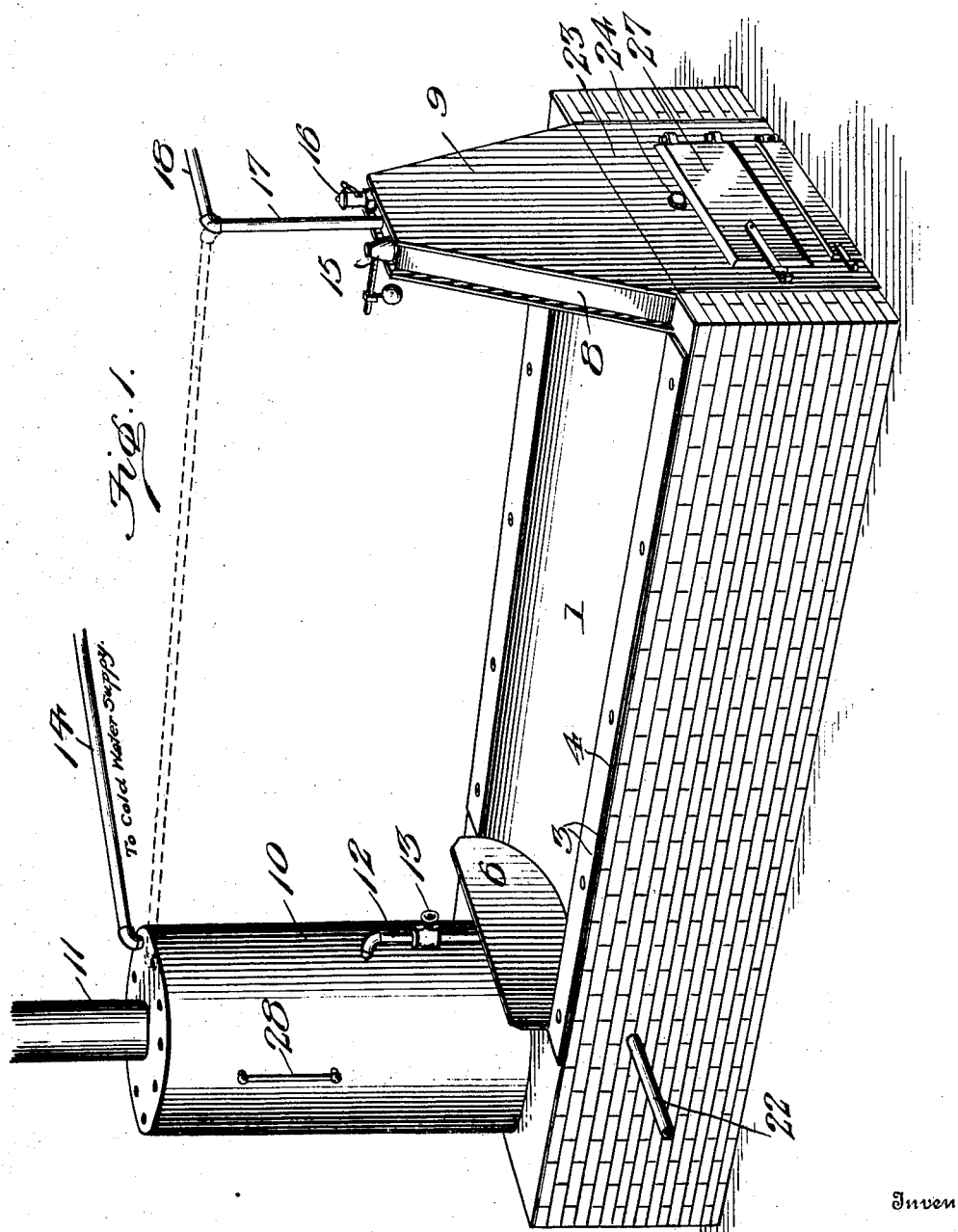

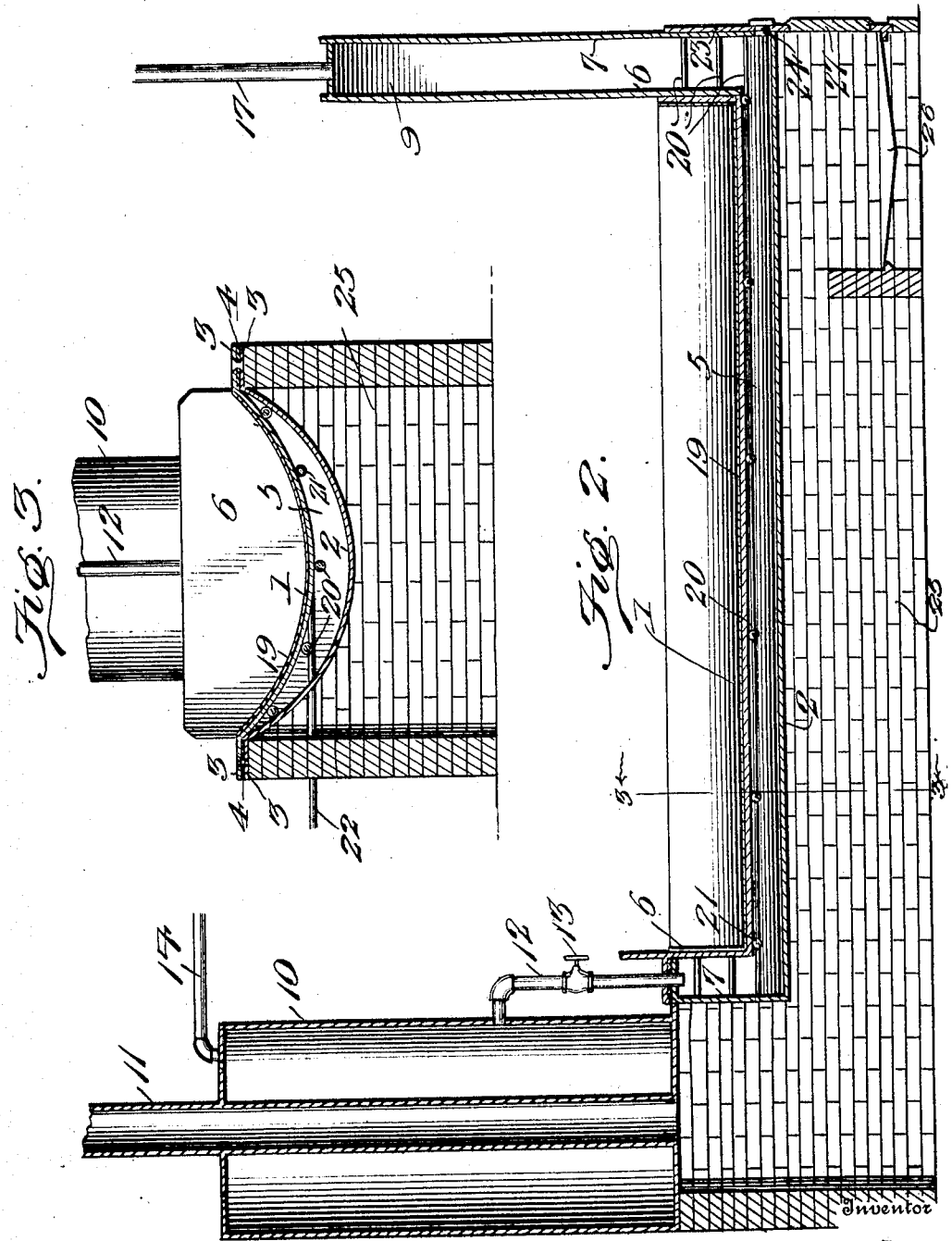

UNITED STATES PATENT OFFICE.

WILLIAM B. OGDEN, OF ENID, OKLAHOMA.

EVAPORATING-PAN.

No. 895,669.      Specification of Letters Patent.      Patented Aug. 11, 1908.

Application filed April 17, 1907. Serial No. 368,721.

*To all whom it may concern:*

Be it known that I, WILLIAM B. OGDEN, a citizen of the United States, residing at Enid, in the county of Garfield, Oklahoma, have invented new and useful Improvements in Evaporating-Pans, of which the following is a specification.

This invention relates to evaporating pans, and it has for its object to provide a device of this class which may be advantageously employed for evaporating cane, sorghum and other juice in the manufacture of molasses, in the manufacture of fruit butter, for drying fruits, and in fact for all purposes for which a device of this class may be utilized.

Further objects of the invention are to construct an evaporating pan which will not be exposed at any portion of its surface to the action of dry and superheated steam whereby the contents might be scorched.

A further object of the invention is to construct an evaporating pan having at one end a tank for the supply of hot water and at the other end a steam dome from which steam may be taken for the purpose of running an engine or for any other purposes desired.

Still further objects of the invention are to simplify and improve the construction and operation of this class of devices.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention; it being, however understood that no limitation is necessarily made to the precise structural details therein exhibited, but that changes, alterations and modifications within the scope of the invention may be resorted to when desired.

In the drawings, Figure 1 is a perspective view of an evaporating pan constructed in accordance with the invention. Fig. 2 is a longitudinal sectional view of the same. Fig. 3 is a transverse sectional view taken on the plane indicated by the line 3—3 in Fig. 2.

Corresponding parts in the several figures are denoted by like characters of reference.

The evaporating pan proper may be of any desired shape and dimensions. For purposes of illustration, it has been shown as consisting of an elongated tank comprising an inner pan 1 and an outer pan 2; said pans being provided along their edges with flanges 3 between which packing 4 of any suitable material such as lead or other soft metal has been interposed to form a steam tight joint; said flanges being bolted or otherwise suitably secured together. In the drawings, the pans have been shown as being constructed each of a sheet of metal bent to approximately semi-circular shape so as to form between said sheets or pans a water space 5 of crescent shape in cross-section, as will be clearly seen in Fig. 3. Said pans are provided with end walls 6 and 7 which are spaced apart so that the water space 5 will extend between the ends of the pans, as shown in Fig. 2. The end walls at the front ends of the tank are extended upward and are connected with each other by an intermediate strip 8 so as to form a steam dome 9.

Suitably supported adjacent to the rear end of the pan is an upright cylindrical tank 10 through which extends a flue 11, said tank being connected with the water space by means of a pipe 12 having a cock or valve 13; the tank is provided with a feed pipe 14 which may be equipped with an injector of well known construction for the purpose of injecting feed water into the tank. The steam dome 9 supports a safety valve 15 and, if desired, a whistle 16; and a steam pipe 17 connected with the top of the steam dome may be connected with the tank 10, as shown in dotted lines in Fig. 1 of the drawings for the purpose of returning steam to the tank in order to assist in heating the contents of the latter; or the steam pipe may be branched off laterally, as shown at 18, to enable the steam to be utilized for the purpose of operating an engine, or for any desired purpose.

The inner pan 1 is preferably provided with a coating 19 of enamel or other non-corrodible material, whereby it will be protected from the action of acids contained in the juices of fruits placed in the pan; the end walls 7 of the outer pan are connected by longitudinally disposed rods 20 which are placed adjacent to the underside of the inner pan, and anti-friction balls 21 are disposed at intervals upon the rods 20 to bear against and assist in supporting the weight of the said inner pan to prevent vibration of the latter and to protect the enamel coating from cracking. A discharge pipe 22 is suitably connected with the inner pan and extends through the wall of the outer pan for the purpose of enabling the said inner pan to be drained of its contents. The front wall of the outer pan has a discharge aperture 23 provided with a plug or closure 24 in order to enable dregs and sediment to be blown out of the water space, when necessary; steam or hot water for this purpose being supplied through the valved pipe 12.

The pan and the tank are to be supported for operation upon a suitably constructed furnace 25 which may be arranged for burning coal, wood, stalks, bagasse or any other fuel which may be conveniently available, the products of combustion being conducted through the flue 11 of the boiler, the contents of which will thus be heated. It is to be understood that while a brick furnace of permanent construction has been shown in the drawings, a portable furnace or heating apparatus constructed of sheet metal or other suitable material may be employed; the furnace being provided with a grate 26 and fire dome 27 of any suitable and well known construction. It is desired to be further understood that the improved evaporating pan may, within the scope of the invention, be made of suitable dimensions to enable it to be supported upon an ordinary stove or range, for ordinary household use, in which event the flue of the tank may constitute one of the joints of stove pipe.

A gage glass 28 of ordinary construction may be used for the purpose of enabling the stage of the water in the apparatus to be conveniently observed; said gage glass having been shown as applied to the side of the tank, but it may be obviously used in any desired and convenient location.

It will be seen from the foregoing description taken in connection with the drawings hereto annexed, that while the entire bottom surface of a tank will be exposed to the heat of the stove or furnace in connection with which the pan is used, and that the water in the space between the pans 1 and 2 will thus be very quickly heated and maintained at boiling heat, steam will not under any circumstances accumulate in the water space 5, but will rise into the steam dome from which it may be returned to the tank for the purpose of assisting in maintaining the temperature of the water contents in the latter, or otherwise utilized. The contents of the evaporating pan will thus be thoroughly heated, and the moisture evaporated, without danger of scorching which is liable to occur when evaporating pans of ordinary construction are used.

The construction is simple, and thoroughly efficient for the purposes for which it is provided.

Having thus fully described the invention, what I claim as new is:—

1. An evaporating pan having a water space extended upward at the ends thereof, a steam dome at one end of said pan, a water tank supported adjacent to the other end of the pan, and a valved pipe connecting the boiler with the water space.

2. An evaporating pan having a water space extended upward at the ends thereof, a steam dome connected to and forming an extension of the water space at one end of said pan, a tank supported adjacent to the other end of the pan, a valved pipe connecting the boiler with the water space and a return pipe connected to the steam dome.

3. An evaporating pan comprising inner and outer members spaced apart to form an intermediate water space, a tank supported adjacent to one end of the pan, a valved pipe connecting the tank with the water space, said water space being provided with a discharge opening at the end opposite the tank, and a plug for said discharge opening.

In testimony whereof, I affix my signature in presence of two witnesses.

WILLIAM B. OGDEN.

Witnesses:
SAMUEL B. OGDEN,
JOHN F. PAYNE.